(12) United States Patent
McBurnett et al.

(10) Patent No.: US 10,577,113 B2
(45) Date of Patent: Mar. 3, 2020

(54) USING TWO OR MORE CENTRALIZED CIRCUIT REGULATED CIRCUIT CONTROL MODULE

(71) Applicant: GOODRICH CORPORATION, Charlotte, NC (US)

(72) Inventors: Wilfred Ray McBurnett, Chandler, AZ (US); Adetayo (Tayo) Adetunji, Laveen, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 227 days.

(21) Appl. No.: 15/927,780

(22) Filed: Mar. 21, 2018

(65) Prior Publication Data

US 2019/0291880 A1    Sep. 26, 2019

(51) Int. Cl.
*B64D 25/14* (2006.01)
*F21V 23/00* (2015.01)
*F21V 33/00* (2006.01)
*F21Y 115/10* (2016.01)
*F21W 107/30* (2018.01)

(52) U.S. Cl.
CPC ............ *B64D 25/14* (2013.01); *F21V 23/003* (2013.01); *F21V 33/0076* (2013.01); *B64D 2203/00* (2013.01); *F21W 2107/30* (2018.01); *F21Y 2115/10* (2016.08)

(58) Field of Classification Search
CPC ....................................................... B64D 25/14
See application file for complete search history.

(56) References Cited

U.S. PATENT DOCUMENTS 10,182,477 B1 *    1/2019    Leegate ............. H05B 33/0815

* cited by examiner

*Primary Examiner* — Daniel J Cavallari
(74) *Attorney, Agent, or Firm* — Snell & Wilmer LLP

(57) ABSTRACT

An inflatable flotation device includes a main body and a plurality of light emitters coupled to the main body and configured to output light. The inflatable flotation device further includes a power connector including a positive terminal and a negative terminal configured to receive at least one of an input voltage or an input current therebetween. The inflatable flotation device further includes a first circuit control module (CCM) coupled between the power connector and the plurality of light emitters and configured to regulate the at least one of the input voltage or the input current to at least one of an operating voltage or an operating current of the plurality of light emitters. The inflatable flotation device further includes a second CCM coupled between the power source and the plurality of the light emitters and configured to regulate the at least one of the input voltage or the input current to the at least one of the operating voltage or the operating current such that the plurality of light emitters can receive the at least one of the operating voltage or the operating current in response to failure of at least one of the first CCM or the second CCM.

20 Claims, 5 Drawing Sheets

USING TWO OR MORE CENTRALIZED CIRCUIT REGULATED CIRCUIT CONTROL MODULE

FIELD

The present disclosure is directed to evacuation systems for use in aircraft and, more particularly, to inflatable flotation devices having light emitters and circuit control modules for controlling power distribution to the light emitters.

BACKGROUND

Evacuation systems of aircraft may include an inflatable flotation device, such as an evacuation slide, and an aspirator for inflating the inflatable flotation device. Inflatable flotation devices may include light emitters to provide illumination during evacuations at night and other dark situations. Conventional inflatable flotation devices include a single circuit control module (CCM) that regulates the voltage and/or current applied to each of the light emitters. In response to failure of the CCM, the light emitters may be incapable of emitting light.

SUMMARY

Described herein is an inflatable flotation device having redundant lighting capabilities. The inflatable flotation device includes a main body. The inflatable flotation device further includes a plurality of light emitters coupled to the main body and configured to output light. The inflatable flotation device further includes a power connector including a positive terminal and a negative terminal configured to receive at least one of an input voltage or an input current therebetween. The inflatable flotation device further includes a first circuit control module (CCM) coupled between the power connector and the plurality of light emitters and configured to regulate the at least one of the input voltage or the input current to at least one of an operating voltage or an operating current of the plurality of light emitters. The inflatable flotation device further includes a second CCM coupled between the power connector and the plurality of the light emitters and configured to regulate the at least one of the input voltage or the input current to the at least one of the operating voltage or the operating current such that the plurality of light emitters can receive the at least one of the operating voltage or the operating current in response to failure of at least one of the first CCM or the second CCM.

In any of the foregoing embodiments, each of the plurality of light emitters is a light emitting diode (LED).

In any of the foregoing embodiments, the main body has a head, a foot, a first rail, and a second rail, and a first group of light emitters is located along the first rail, a second group of light emitters is located along the second rail, and a third group of light emitters is located along the foot.

In any of the foregoing embodiments, the third group of light emitters are referred to as toe lights and produce greater illumination than at least one of the first group of light emitters or the second group of light emitters.

Any of the foregoing embodiments may also include a battery configured to provide the at least one of the input voltage or the input current and to be connected to the power connector.

In any of the foregoing embodiments, the first CCM and the second CCM are both separate from the battery such that the battery is replaceable without replacing at least one of the first CCM or the second CCM.

In any of the foregoing embodiments, the plurality of light emitters is oriented along a path having a first end and a second end; the first CCM is located between the power connector and the first end; and the second CCM is located between the power connector and the second end.

In any of the foregoing embodiments, the main body is configured for use as an evacuation route from an aircraft, and the power connector is configured to receive the at least one of the input voltage or the input current from a power source of the aircraft.

Also disclosed is a system for aircraft evacuation. The system includes a main body. The system also includes a plurality of light emitters coupled to the main body, oriented along a path having a first end and a second end, and configured to output light. The system also includes a power connector including a positive terminal and a negative terminal configured to receive at least one of an input voltage or an input current therebetween. The system also includes a first circuit control module (CCM) coupled between the power connector and the first end of the plurality of light emitters and configured to regulate the at least one of the input voltage or the input current to at least one of an operating voltage or an operating current of the plurality of light emitters. The system also includes a second CCM coupled between the power connector and the second end of the plurality of light emitters and configured to regulate the at least one of the input voltage or the input current to the at least one of the operating voltage or the operating current such that the plurality of light emitters can receive the at least one of the operating voltage or the operating current in response to failure of at least one of the first CCM or the second CCM.

In any of the foregoing embodiments, each of the plurality of light emitters is a light emitting diode (LED).

In any of the foregoing embodiments, the main body has a head, a foot, a first rail, and a second rail, and a first group of light emitters at the first end is located along the first rail, a second group of light emitters at the second end is located along the second rail, and a third group of light emitters is located along the foot.

In any of the foregoing embodiments, the third group of light emitters are referred to as toe lights and produce greater illumination than at least one of the first group of light emitters or the second group of light emitters.

Any of the foregoing embodiments may also include a battery configured to provide the at least one of the input voltage or the input current and to be connected to the power connector.

In any of the foregoing embodiments, the first CCM and the second CCM are both separate from the battery such that the battery is replaceable without replacing at least one of the first CCM or the second CCM.

In any of the foregoing embodiments, the main body is an inflatable flotation device for use with an aircraft, and the power connector is configured to receive the at least one of the input voltage or the input current from a power source of the aircraft.

Also disclosed is an aircraft. The aircraft includes a fuselage. The aircraft also includes an inflatable flotation device. The inflatable flotation device includes a main body. The inflatable flotation device also includes a plurality of light emitters coupled to the main body and configured to output light. The inflatable flotation device also includes a power connector including a positive terminal and a negative terminal configured to receive at least one of an input voltage or an input current therebetween. The inflatable flotation device also includes a first circuit control module (CCM) coupled between the power connector and the plurality of light emitters and configured to regulate the at least one of the input voltage or the input current to at least one of an operating voltage or an operating current of the plurality of light emitters. The inflatable flotation device also includes a second CCM coupled between the power connector and the plurality of the light emitters and configured to regulate the at least one of the input voltage or the input current to the at least one of the operating voltage or the operating current such that the plurality of light emitters can receive the at least one of the operating voltage or the operating current in response to failure of at least one of the first CCM or the second CCM.

In any of the foregoing embodiments; a first group of light emitters at the first end is located along the first rail; a second group of light emitters at the second end is located along the second rail; a third group of light emitters is located along the foot; and the third group of light emitters are referred to as toe lights and produce greater illumination than at least one of the first group of light emitters or the second group of light emitters.

In any of the foregoing embodiments, the inflatable flotation device further includes a battery configured to provide the at least one of the input voltage or the input current and to be connected to the power connector; and the first CCM and the second CCM are both separate from the battery such that the battery is replaceable without replacing at least one of the first CCM or the second CCM.

In any of the foregoing embodiments, the plurality of light emitters is oriented along a path having a first end and a second end; the first CCM is located between the power connector and the first end; and the second CCM is located between the power connector and the second end.

Any of the foregoing embodiments may also include a power source coupled to the fuselage and configured to provide the power source to the power connector of the inflatable flotation device.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
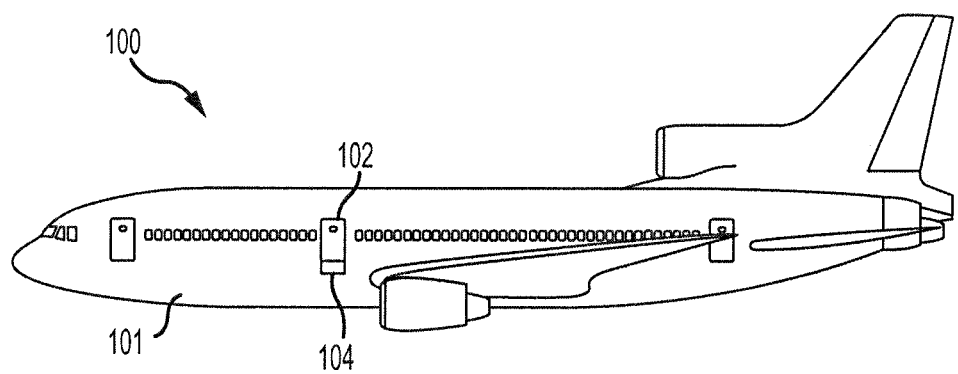
FIG. 1 is a drawing of an aircraft having an exit door and an evacuation system, in accordance with various embodiments.

Referring now to FIG. 1, an aircraft 100 is shown. The aircraft 100 may include a fuselage 101 having a plurality of exit doors including an exit door 102. The aircraft 100 may include one or more evacuation systems positioned near a corresponding exit door. For example, the aircraft 100 includes an evacuation system 104 positioned near the exit door 102. The evacuation system 104 may be removably coupled to the fuselage 101. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member such as depression of a button or actuation of a lever.

Figure 2:
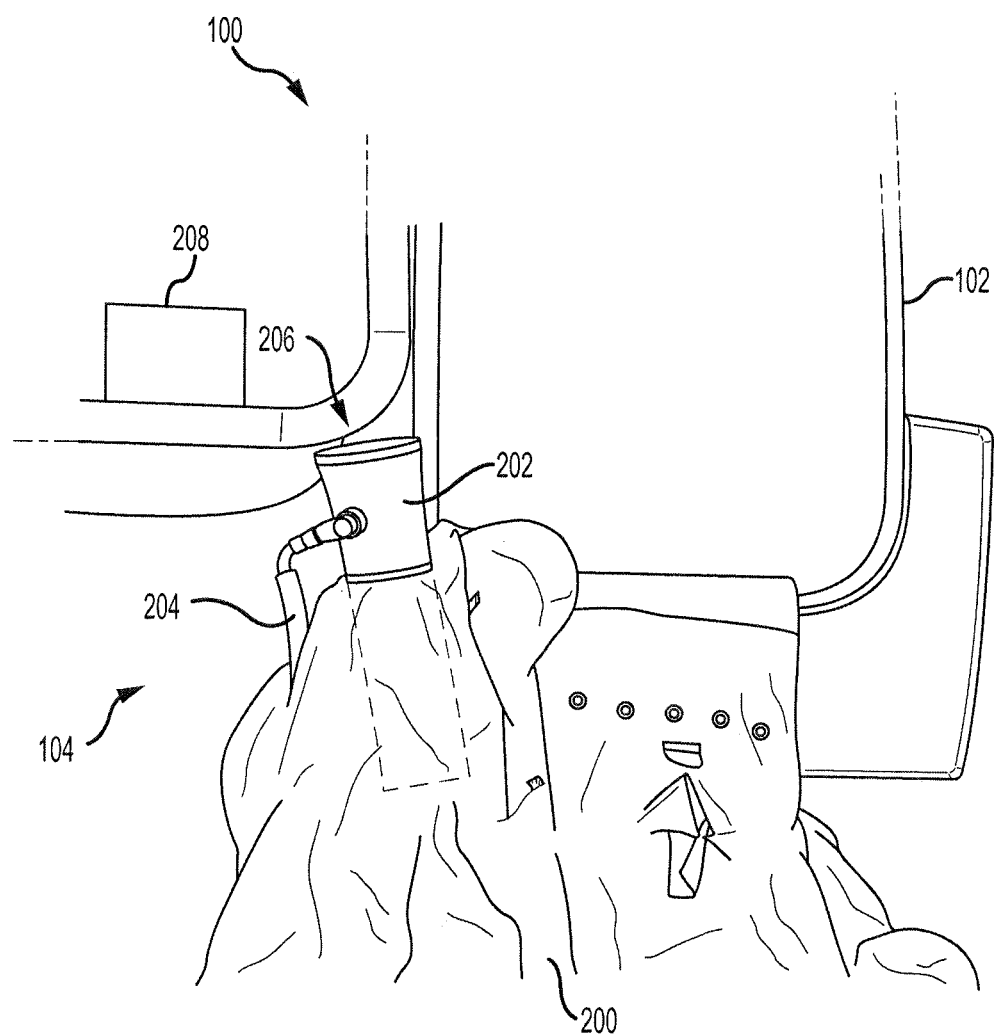
FIG. 2 is a drawing of the evacuation system of FIG. 1 including an inflatable flotation device, in accordance with various embodiments.

Turning to FIG. 2, additional details of the evacuation system 104 are illustrated. In particular, the evacuation system 104 includes an inflatable flotation device 200. The evacuation system 104 further includes a source of forced gas 206. The source of forced gas 206 may cause a gas to enter the inflatable flotation device 200 to inflate the inflatable flotation device 200. The inflatable flotation device 200 may be coupled to the fuselage 101 of FIG. 1, and may be decoupled from the fuselage 101 in response to being fully inflated or to being manually detached in order to allow passengers and/or crew members to safely float away from the aircraft 100 of FIG. 1. In various embodiments, the inflatable flotation device 200 may be permanently coupled to the fuselage 101. In various embodiments, the inflatable flotation device 200 may function as a slide from the fuselage 101 to a ground surface upon which the aircraft 100 is resting.

The source of forced gas 206 may include an aspirator 202 coupled to the inflatable flotation device 200, piping 204 coupled to the aspirator 202, and a compressed fluid source coupled to the piping 204. Under normal operating conditions, the inflatable flotation device 200 may be deflated and stored within a compartment of the aircraft 100. In various embodiments, the inflatable flotation device 200 and the aspirator 202 may be stored in a single package within the aircraft compartment. In response to deployment of the evacuation system 104, fluid may flow into the aspirator 202 via the piping 204 at a relatively high velocity. This fluid flow may cause the aspirator 202 to draw gas from the environment. The fluid flow (such as in a gaseous state) and the environmental gas may be directed into the inflatable flotation device 200. In response to receiving the fluid flow and the environmental gas, the inflatable flotation device 200 may begin to inflate.

Figure 3:
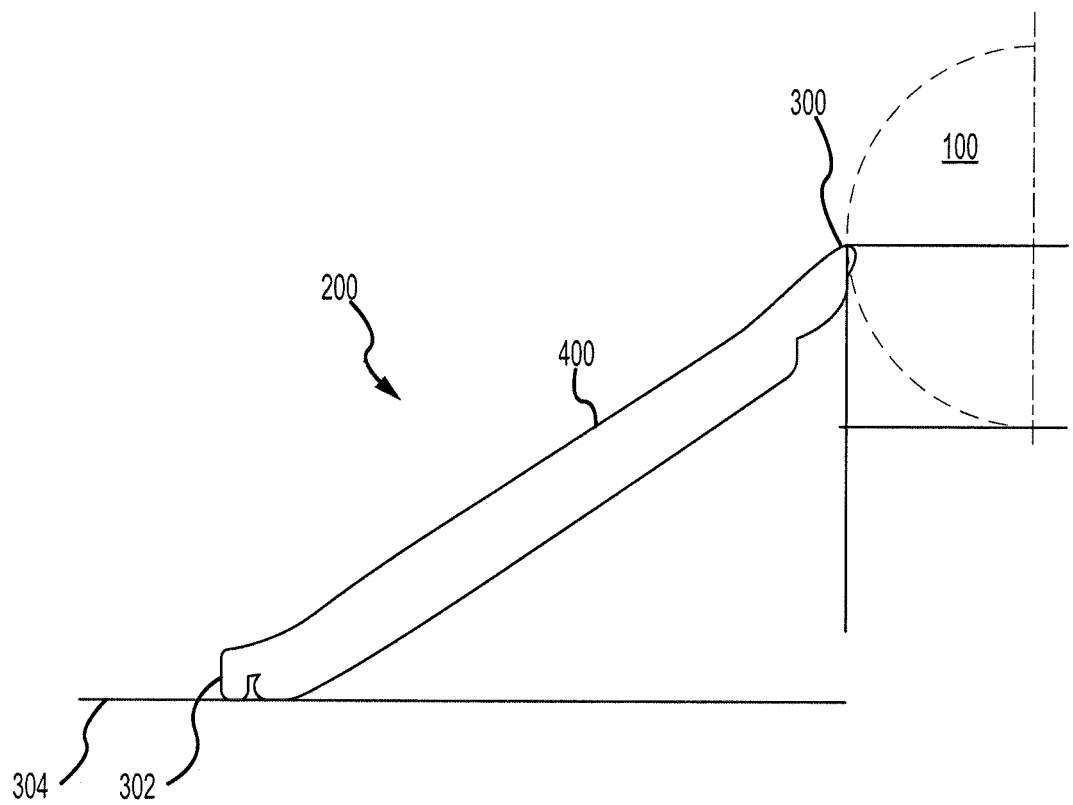
FIG. 3 is a drawing of the inflatable flotation device of FIG. 2 in an inflated configuration, in accordance with various embodiments.

Turning now to FIG. 3, the inflatable flotation device 200 may include a main body 400. The main body 400 may define a volume capable of receiving gas from the aspirator 202 of FIG. 2. The main body 400 may further define a surface on which passengers may rest in response to the inflatable flotation device 200 being detached from the aircraft 100.

Figure 4:
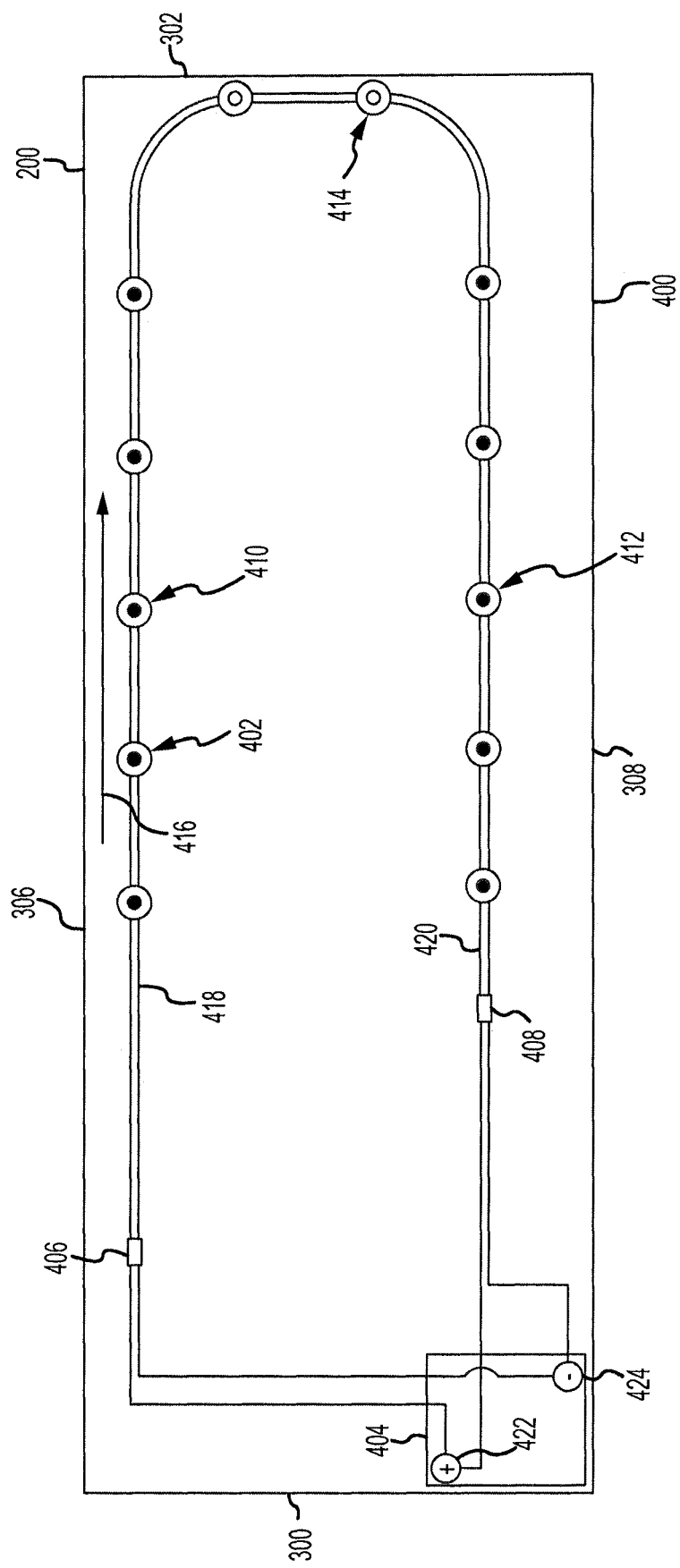
FIG. 4 is a drawing of the inflatable flotation device having a plurality of light emitters and multiple circuit control modules, in accordance with various embodiments.

Referring to FIGS. 3 and 4, the main body 400 may include a head 300, a foot 302, a first rail 306, and a second rail 308. In response to deployment of the inflatable flotation device 200, the foot 302 may contact a ground surface 304.

In the case that deployment of the inflatable flotation device 200 occurs in the dark, it is desirable for the inflatable flotation device 200 to become illuminated. In that regard, the inflatable flotation device 200 may include a plurality of light emitters 402.

The light emitters 402 may include any object or device capable of emitting light. For example, the light emitters 402 may include one or more of an electric discharge light source (such as an arc lamp (such as a neon lamp) or a fluorescent lamp), an incandescence light source (such as an incandescent lightbulb or a halogen lamp), a light emitting diode (LED), or the like.

Referring to FIGS. 2, 3, and 4, the inflatable flotation device 200 may include a power connector 404 that is designed to receive power from a power source 208 of the aircraft 100. The power connector 404 may include a positive terminal 422 and a negative terminal 424. The positive terminal 422 may receive a positive voltage and/or current. The negative terminal 424 may receive a negative voltage and/or current, or may be coupled to a ground.

The power may be usable to power the light emitters 402. However, the power source 208 may provide power having a different voltage, current, or format than what is usable by the light emitters 402. In that regard, the inflatable flotation device 200 may include two or more circuit control modules (CCMs) 406, 408 that convert the power from the power source 208 into at least one of an operating voltage or an operating current of the light emitters 402 (i.e., power that is usable by the light emitters 402).

The CCMs 406, 408 may include one or more processor and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the CCMs 406, 408 may include voltage converters that increase or decrease at least one of the voltage or the current provided by the power source 208 to the at least one of the operating voltage or the operating current of the light emitters 402.

The plurality of light emitters 402 may include a first group of light emitters 410, a second group of light emitters 412, and a third group of light emitters 414. The first group of light emitters 410 and the second group of light emitters 412 may be located along the first rail 306 and the second rail 308, respectively. The third group of light emitters 414 may be located at the foot 302 of the inflatable flotation device 200 and may be referred to as toe lights.

In various embodiments, it may be desirable for the third group of light emitters 414 (i.e., the toe lights) to produce greater illumination (i.e., output more lumens) than at least one of the first group of light emitters 410 or the second group of light emitters 412. Stated differently, each of the third group of light emitters 414 may output more lumens than each of the first group of light emitters 410, or the entire third group of light emitters 414 may output more lumens than the entire first group of light emitters 410.

The plurality of light emitters 402 may be oriented along a path having a first end 418 connected to one terminal of the power connector 404 and a second end 420 connected to a second terminal of the power connector 404. In various embodiments, the first CCM 406 may be located between the power connector 404 (such as the positive terminal 422) and the first end 418 of the plurality of light emitters 402, and the second CCM 408 may be located between the power connector 404 (such as the negative terminal 424) and the second end 420 of the plurality of light emitters 402. In that regard, if the first CCM 406 fails, power may be provided to each of the plurality of light emitters 402 via the second CCM 408 from the second end 420. Likewise, if the second CCM 408 fails, power may be provided to each of the plurality of light emitters 402 via the first CCM 406 from the first end 418.

Figure 5:
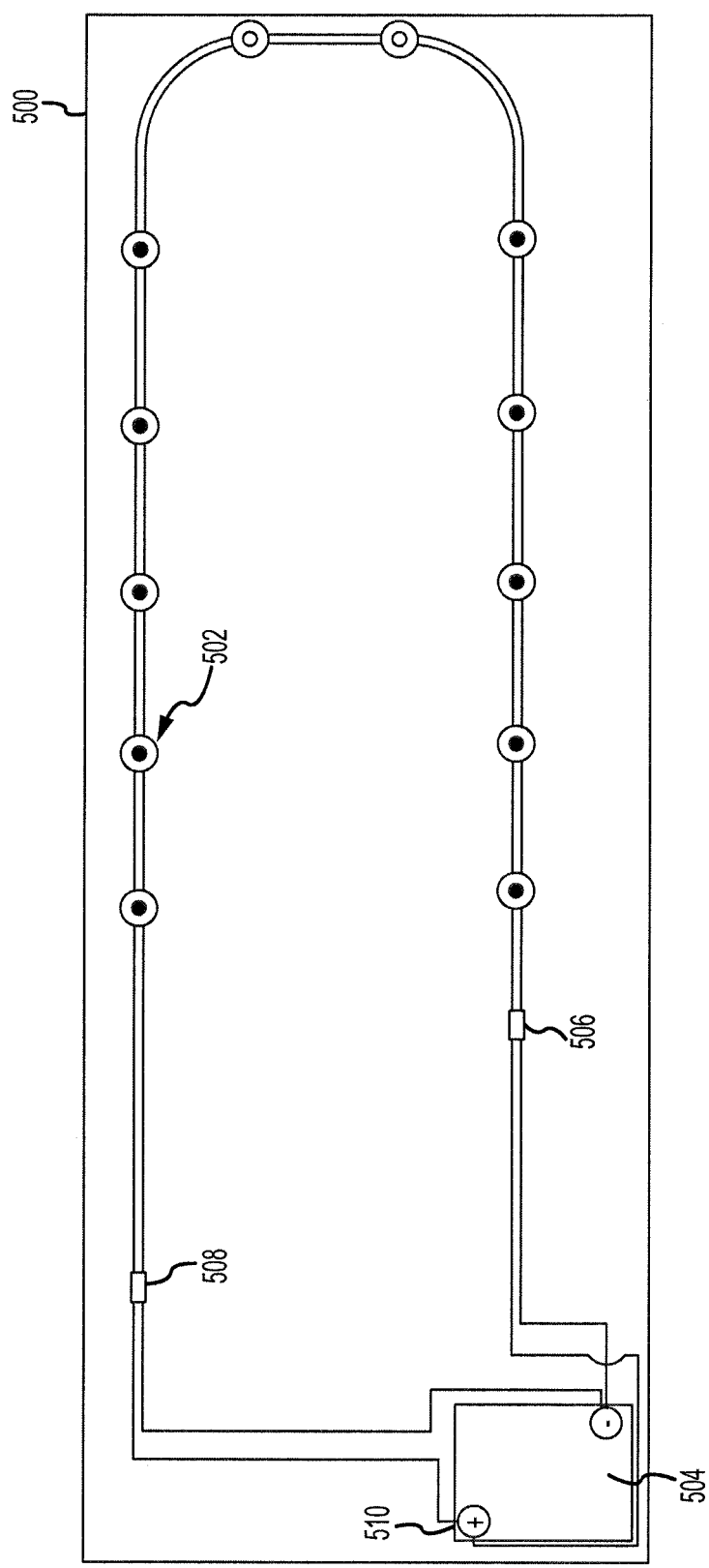
FIG. 5 is a drawing of an inflatable flotation device having a plurality of light emitters and multiple circuit control modules along with a battery, in accordance with various embodiments.

Turning now to FIG. 5, another inflatable flotation device 500 is shown. The inflatable flotation device 500 may be similar to the inflatable flotation device 200 shown in FIG. 4. In that regard, the inflatable flotation device 500 may include a plurality of light emitters 502, a power connector 510, a first CCM 508, and a second CCM 506 that are oriented in a similar manner as the inflatable flotation device 200 shown in FIG. 4. However, the inflatable flotation device 500 may include a battery 504 that is connected to the power connector 510. The battery 504 may provide electricity for powering the plurality of light emitters 502. In that regard, the light emitters 502 of the inflatable flotation device 500 may be powered without use of power from a corresponding aircraft.

Conventional inflatable flotation devices may include a CCM that is attached to a battery of the inflatable flotation device. However, the CCMs 506, 508 of the inflatable flotation device 500 may be separate from the battery 504. In that regard, and response to failure of the battery 504 (or failure of one of the CCMs 506, 508) the battery 504 (or the failed CCM 508, 510) may be replaced as a single part. Stated differently, in response to failure of the battery 504, the battery 504 may be replaced without replacing at least one of the CCMs 506, 508, or without replacing either of the CCMs 506, 508.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. Throughout the present disclosure, like references numbers may denote like elements. Accordingly, elements with element numbering may be shown in the figures, but may not necessarily be repeated herein for the sake of clarity. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable flotation device having redundant lighting capabilities, comprising:
   a main body;
   a plurality of light emitters coupled to the main body and configured to output light;
   a power connector including a positive terminal and a negative terminal configured to receive at least one of an input voltage or an input current therebetween;
   a first circuit control module (CCM) coupled between the power connector and the plurality of light emitters and configured to regulate the at least one of the input voltage or the input current to at least one of an operating voltage or an operating current of the plurality of light emitters; and
   a second CCM coupled between the power connector and the plurality of light emitters and configured to regulate the at least one of the input voltage or the input current to the at least one of the operating voltage or the operating current such that the plurality of light emitters can receive the at least one of the operating voltage or the operating current in response to failure of at least one of the first CCM or the second CCM.

2. The inflatable flotation device of claim 1, wherein each of the plurality of light emitters is a light emitting diode (LED).

3. The inflatable flotation device of claim 1, wherein the main body has a head, a foot, a first rail, and a second rail, and a first group of light emitters is located along the first rail, a second group of light emitters is located along the second rail, and a third group of light emitters is located along the foot.

4. The inflatable flotation device of claim 3, wherein the third group of light emitters are referred to as toe lights and produce greater illumination than at least one of the first group of light emitters or the second group of light emitters.

5. The inflatable flotation device of claim 1, further comprising a battery configured to provide the at least one of the input voltage or the input current and to be connected to the power connector.

6. The inflatable flotation device of claim 5, wherein the first CCM and the second CCM are both separate from the battery such that the battery is replaceable without replacing at least one of the first CCM or the second CCM.

7. The inflatable flotation device of claim 1 wherein:
   the plurality of light emitters is oriented along a path having a first end and a second end;
   the first CCM is located between the power connector and the first end; and
   the second CCM is located between the power connector and the second end.

8. The inflatable flotation device of claim 1, wherein the main body is configured for use as an evacuation route from an aircraft, and wherein the power connector is configured to receive the at least one of the input voltage or the input current from a power source of the aircraft.

9. A system for aircraft evacuation, comprising:
   a main body;
   a plurality of light emitters coupled to the main body, oriented along a path having a first end and a second end, and configured to output light;
   a power connector including a positive terminal and a negative terminal configured to receive at least one of an input voltage or an input current therebetween;
   a first circuit control module (CCM) coupled between the power connector and the first end of the plurality of light emitters and configured to regulate the at least one of the input voltage or the input current to at least one of an operating voltage or an operating current of the plurality of light emitters; and
   a second CCM coupled between the power connector and the second end of the plurality of light emitters and configured to regulate the at least one of the input voltage or the input current to the at least one of the operating voltage or the operating current such that the plurality of light emitters can receive the at least one of the operating voltage or the operating current in response to failure of at least one of the first CCM or the second CCM.

10. The system of claim 9, wherein each of the plurality of light emitters is a light emitting diode (LED).

11. The system of claim 9, wherein the main body has a head, a foot, a first rail, and a second rail, and a first group of light emitters at the first end is located along the first rail, a second group of light emitters at the second end is located along the second rail, and a third group of light emitters is located along the foot.

12. The system of claim 11, wherein the third group of light emitters are referred to as toe lights and produce greater illumination than at least one of the first group of light emitters or the second group of light emitters.

13. The system of claim 9, further comprising a battery configured to provide the at least one of the input voltage or the input current and to be connected to the power connector.

14. The system of claim 13, wherein the first CCM and the second CCM are both separate from the battery such that the battery is replaceable without replacing at least one of the first CCM or the second CCM.

15. The system of claim 9, wherein the main body is an inflatable flotation device for use with an aircraft, and wherein the power connector is configured to receive the at least one of the input voltage or the input current from a power source of the aircraft.

16. An aircraft comprising:
a fuselage; and
an inflatable flotation device, comprising:
a main body,
a plurality of light emitters coupled to the main body and configured to output light,
a power connector including a positive terminal and a negative terminal configured to receive at least one of an input voltage or an input current therebetween,
a first circuit control module (CCM) coupled between the power connector and the plurality of light emitters and configured to regulate the at least one of the input voltage or the input current to at least one of an operating voltage or an operating current of the plurality of light emitters, and
a second CCM coupled between the power connector and the plurality of light emitters and configured to regulate the at least one of the input voltage or the input current to the at least one of the operating voltage or the operating current such that the plurality of light emitters can receive the at least one of the operating voltage or the operating current in response to failure of at least one of the first CCM or the second CCM.

17. The aircraft of claim 16, wherein:
the main body has a head, a foot, a first rail, and a second rail;
a first group of light emitters at a first end is located along the first rail;
a second group of light emitters at a second end is located along the second rail;
a third group of light emitters is located along the foot; and
the third group of light emitters are referred to as toe lights and produce greater illumination than at least one of the first group of light emitters or the second group of light emitters.

18. The aircraft of claim 16, wherein:
the inflatable flotation device further includes a battery configured to provide the at least one of the input voltage or the input current and to be connected to the power connector; and
the first CCM and the second CCM are both separate from the battery such that the battery is replaceable without replacing at least one of the first CCM or the second CCM.

19. The aircraft of claim 16, wherein:
the plurality of light emitters is oriented along a path having a first end and a second end;
the first CCM is located between the power connector and the first end; and
the second CCM is located between the power connector and the second end.

20. The aircraft of claim 16, further comprising a power source coupled to the fuselage and configured to provide the power source to the power connector of the inflatable flotation device.

* * * * *